United States Patent
Balsi et al.

[11] Patent Number: 5,864,836
[45] Date of Patent: Jan. 26, 1999

[54] OPTICALLY PROGRAMMABLE OPTOELECTRONIC CELLULAR NEURAL NETWORK

[75] Inventors: Marco Balsi; Valerio Cimagalli; Fabrizio Galluzzi, all of Rome, Italy

[73] Assignee: Universita' Degli Studi di Roma "La Sapienza", Rome, Italy

[21] Appl. No.: 721,600

[22] Filed: Sep. 26, 1996

[30] Foreign Application Priority Data

Oct. 12, 1995 [IT] Italy ................. RM95A0678

[51] Int. Cl.$^6$ ............... G06F 15/62; G06G 7/16
[52] U.S. Cl. .................................... 706/40; 706/10
[58] Field of Search ............. 395/25, 11; 706/40, 706/10

[56] References Cited

U.S. PATENT DOCUMENTS

| | | | |
|---|---|---|---|
| 4,585,937 | 4/1986 | Schneider | 250/227 |
| 4,585,948 | 4/1986 | Schneider et al. | 250/216 |
| 4,760,437 | 7/1988 | Denker et al. | 395/25 |
| 4,988,891 | 1/1991 | Mashiko | 395/25 |
| 4,999,688 | 3/1991 | Hara et al. | 395/25 |
| 5,014,096 | 5/1991 | Matsuda et al. | 395/25 |
| 5,056,897 | 10/1991 | Akiyama et al. | 395/25 |
| 5,229,623 | 7/1993 | Tanoue et al. | 257/25 |
| 5,255,362 | 10/1993 | Brandstetter et al. | 395/25 |
| 5,268,679 | 12/1993 | Shannon | 345/4 |
| 5,285,308 | 2/1994 | Jenkins et al. | 359/260 |
| 5,339,090 | 8/1994 | Grossland et al. | 345/90 |
| 5,428,711 | 6/1995 | Akiyama et al. | 395/25 |
| 5,515,189 | 5/1996 | Kuratomi et al. | 395/25 |
| 5,546,504 | 8/1996 | Isoda et al. | 395/25 |
| 5,561,287 | 10/1996 | Turner et al. | 250/208.2 |
| 5,640,261 | 6/1997 | Ono | 395/25 |
| 5,711,988 | 1/1998 | Tsai et al. | 427/80 |

*Primary Examiner*—George B. Davis
*Attorney, Agent, or Firm*—Herbert Dubno

[57] ABSTRACT

An optoelectronic cellular neural network, which can be programmed optically, in amorphous or polycrystalline silicon, which makes up a monolithic image processing system with optical input and output which can be programmed by optical signals. Its layered structure for both the upper and lower surfaces are occupied, without discontinuity, by photosensitive and photoemissive devices. The network basically consists of an input photosensitive layer, a processing layer, a photosensitive control layer and also an optical control mask.

13 Claims, 3 Drawing Sheets

OPTICALLY PROGRAMMABLE OPTOELECTRONIC CELLULAR NEURAL NETWORK

FIELD OF THE INVENTION

Our present invention relates to a monolithic image processing system based on cellular neural networks produced in hydrogenated amorphous or polycrystalline silicon, with an optical input and an optical output, which can be optically programmed and whose major advantages include the capacity to be reconfigured (programmed) in real time by means of optical signals.

In the scientific field, the invention pertains to neural networks, electronic circuits, image processing devices, and specific applications which include the fields of image processing for artificial vision, the extraction of image characteristics, image recognition, improvement and compression, useful above all in the production of telefax, photocopying and image acquisition equipment.

The invention can also be used for applications in the biomedical field, in the field of automatic guidance systems for robots, for increasing the safety of road and rail traffic, for recognizing specific objects (such as bank notes, items on a production line, etc.), for highlighting production defects (for example, printed circuits, fabrics, etc.) and for the segmentation of images (for example in tele-surveying) and for security (antiintrusion systems).

Compared with the existing solutions, an optically programmable optoelectronic cellular neural network offers economic advantages because it can be made at low cost. The material preferably used is hydrogenated amorphous or polycrystalline silicon which, as is known, is less expensive than crystalline silicon generally used for similar products.

In addition, an optically programmable optoelectronic cellular neural network can be made very flexible because it is possible to independently or in parallel, each of the network's connection weights. This is not possible in any earlier system.

In view of the characteristics of an optically programmable optoelectronic cellular neural network, the most promising field of application is that of the processing of printed documents.

More specifically, the invention can be used in telefax, scanner, photocopying or like equipment. It can carry out, totally in parallel, operations such as: image acquisition, halftoning, contrast variation, noise elimination, image improvement, special controls such as a security system to block the copying of bank notes.

The invention's originality lies in the fact that it is a system builds in layers, and in particular the processing layer is located between two photosensitive layers, namely, the input and control layers. "Input" means the acquisition of the image to be processed and "control" means the programming of the functioning of the neural network.

This type of netword can be included in the aforementioned devices making them more sophisticated as their use speed increases because the image is acquired no longer line by line but all simultaneously.

BACKGROUND OF THE INVENTION

[1] (Chua e Yang, 1988) L. O. Chua, L. Yang, "Cellular Neural Networks: Theory", *IEEE Trans. on Circuit and Systems*, CAS-38(10), 1257–1272 (1988).

[2] (Roska e Chua, 1993) T. Roska, L. O. Chua, "The CNN Universal Machine: a Universal Array Computer" *IEEE Trans. on Circuits and Systems*, CAS-II-40(3), 163–173 (1993).

[3] (Roska e Kék, 1994) T. Roska, L. Kék, "Analogic CNN Program Library", *Hungarian Academy of Sciences, Budapest*, rep. DNS-5-1994.

[4] (Balsi, 1994) M. Balsi, "Hardware Supervised Learning for Cellular and Hopfield Neural Neetworks", *Proc. of World Canference on Neural Newtworks*, San Diego, Calif., Jun. 4–9, 1994, III, 451.

[5] (Harrer et al., 1992) H. Harrer, J. A. Nossek, R. Stelzl, "An Analog Implementation of Discrete-Time Cellular Neural Networks", *IEEE Trans. on Neural Networks*, NN-3(3) 466–476 (1992).

[6] (Nossek et al., 1992) J. A. Nossek, G. Seiler, T. Roska, L. O. Chua, "Cellular Neural Networks: Theory and Circuit Design", *International Journal of Circuit Theory and Applications*, 20, 533–553 (1992).

[7] (Rodriguez-Vázquez et al., 1993) A. Rodriguez-Vazquez, S. Espejo, R. Dominguez-Castro, J. L. Huertas, E. Sanchez-Sinencio, "Current-Mode Techniques for the Implementation of Continuous- and Discrete-Time Cellular Neural Networks", *IEEE Trans. on Circuit and Systems*, CAS-II-40(3), 132–146 (1993).

[8] (Espejo el al., 1994) S. Espejo, A. Rodriguez-Vazquez, R. Dominguez-Castro, J. L. Huertas, E. S anchez-Sunencio, "Smart-Pixel Cellular Neural Networks in Analog Current-Mode CMOS Technology", *IEEE Journal of Solid-State Circuits*, SSC-29(8), 895–905 (1994).

[9] (Sani el al., 1994) A. Sani, S. Graffi, G. Masetti, G. Setti, "Design of CMOS Cellular Neural Networks Operating at Several Supply Voltages", *Proc. of Third IEEE Int. Workshop on Cellular Neural Networks and their Applications* (CNNA-94), Rome, Italy, Dec. 18–21, 1994, 363–368.

[10] (Sheu el al., 1994) B. J. Sheu, Sa H. Bang, W.-C. Fang, "Analog VLSI Design of Cellular Neural Networks with Annealing Ability", *Proc. of Third IEEE Int. Workshop on Cellular Neural Networks and their Applications* (CNNA-94), Rome, Italy, Dec. 18–21,1994, 387–39.

[11] (Raffo et al., 1994) L. Raffo, S. P. Sabatini, G. M. Bisio, "A Reconfigurable Architecture Mapping Multilayer CNN Paradigms", *Proc. of Third IEEE Int. Workshop on Cellular Neural Networks and their Applications* (CNNA-94), Rome, Italy, Dec. 18–21, 1994, 393–393.

[12] (Sargeni e Bonaiuto, 1994) F. Sargeni, V. Bonaiuto, "High Performance Digitally Programmable CNN Chip with Discrete Templates", *Proc. of Third IEEE Int. Workshop on Cellular Neural Networks and their Applications* (CNNA-94), Rome, Italy, Dec. 18–21, 1994, 67–72.

[13] (Cruz el al., 1994) J. M. Cruz, L. O. Chua, T. Roska, "A Fast, Complex and Efficient Test Implementation of the CNN Universal Machine", *Proc. of Third IEEE Int. Workshop on Cellular Neural Networks and their Applications* (CNNA-94), Rome Italy, Dec. 18–21, 1994, 61–66.

[14] (Lím e Moschytz, 1994) D. Lim, G. S. Moschytz, "A Programmable, Modular CNN Cell", *Proc. of Third IEEE Int. Workshop on Cellular Neural Networks and their Applications* (CNNA-94), Rome, Italy, Dec. 18–21, 1994, 79–84.

[15] (Doan el al., 1994) M.-D. Doan, M. Glesner, R. Chakrabaty, M. Heidenreich, S. Cheung, "Realisation of a Digital Cellular Neural Network for Image Processing", *Proc. of Third IEEE Int. Workshop on Cellular Neural Networks and their Applications* (CNNA-94), Rome, Italy, Dec. 18–21, 1994, 85–90.

[16] (Kinget e Steyaert, 1995) P. Kinget, M. S. J. Steyaert, "A Programmable Analog Cellular Neural Network CMOS Chip for High Speed Image Processing", *IEEE Journal of Solid-State Circuits*, SSC-30(3), 235–243 (1995).

[17] (Beccherelli et al., 1994) R. Beccherelli, G. de Cesare, F. Palma, "Towards an hydrogenated Amorphous Silicon Phototransistor Cellular Neural Network", *Proc. of Third IEEE Int. Workshop on Cellular Neural Networks and their Applications (CNNA-94)*, Rome, Italy, Dec. 18–21, 1994, 357–362.

[18] (Balsi el al., 1994) M. Balsi, I. Ciancaglioni, V. Cimagalli, F. Galluzzi, "Optoelectronic Cellular Neural Networks Based on Amorphous Silicon Thin Film Technology", *Proc. of Third IEEE Int. Workshop on Cellular Neural Networks and their Applications (CNNA-94)*, Rome, Italy, Dec. 18–21, 1994, 399–403.

[19] M. Balsi, "Hardware Supervised Learning for Cellular and Hopfield Neural Networks", *Proc. of World Conference on Neural Networks*, San Diego, Calif., Jun. 4–9, 1994, III, 451.

As is known, a cellular neural network is a system consisting of elementary cells operating in continuous time, equipped with a eral state variable connected with the neighboring cells over a short distance in one-, two-, or three dimensional space. This system can be considered a programmable parallel, analog processor capable in particular of a wide range of applications in the image processing field. It can be made self-adaptive with the addition of the appropriate circuits.

The type of processing realized by a given cellular neural network depends on the entity (sign and module) of the interactions existing between the cells, hence it (the system) is programmable only if it is possible to vary, during the functioning phase, the values of the interactions.

The realization of two-dimensional cellular neural networks takes advantage of the planar typology of the system itself, and this is why it can be implemented using electronic and optoelectronic technology.

Cellular neural networks are generally based on conventional VLSI electronic techniques, and in particular on the CMOS technology.

The sole solution which envisages an integrated optical input on the device is that of Espejo et al (IEEE Journal of Solid-State Circuits, SSC-29(8), 895–905 (1994)).

However, none of the aforementioned systems makes use of an optical output and/or the reconfigurability (control) by means of optical signals.

As regards programmability, the known systems when they envisage such, furnish only the possibility of realizing a discrete series of values for the connection weights between the cells. Programming is always carried out by means of electrical signals, and normally each cell should be prorammed (controlled) in an identical manner to the others.

The possible use of hydrogenated amorphous or polycrystalline silicon was recently studied by Beccherelli et al and by the present inventors, Balsi et al.

The first solution does not contain the project for a complete cellular neural network but only the study of a possible implementative model of a single cell and an interaction mechanism with a similar other such cell. This solution in no way allows programmability during the network's functioning phase, neither does it allow the realization of a general CNN, as the interaction between the cells can only be positive and without gain.

The second solution concerns the preliminary plan for a general CNN, with optical input and output but which is not programmable, as the interactions are defined in absolute values by the relative dimensions of the transistors used, and as to the sign by the type of circuit connection.

SUMMARY OF THE INVENTION

The neural network of the present invention accepts optical input and control signals. The optical input signals are converted into electrical signals by photosensitive electronic devices and processed by the electronic circuits which make up the cellular neural network. The state of the processing circuits is programmed by optical control signals, which are also converted into electrical signals by photosensitive devices. The network's output signals are generally electrical but, in special applications, may be converted into optical signals by photoemissive devices or by liquid crystal displays. In such a network, the photosensitive devices, the processing circuits and any photoemissive or liquid crystal devices are integrated in a single structure.

This integrated network is realized with thin films of hydrogenated amorphous or polycrystalline silicon (a-SIC:H), both intrinsic and doped, and by its alloys, e.g. those with carbon (a-SIC:H), with oxygen (a-SIO:H) and with nitrogen (a-SIN:H). In a specific, but representative case, these thin films are deposited on a substrate of glass or else polymer material. In it the photosensitive elements consist of one or more of the following components:

photo-resistors—photodiodes with SCHOTTKY connections between amorphous semiconductors and semitransparent metals or else between amorphous semiconductors arid non-metallic transparent materials and conductors (e.g. the doped oxides n-$SnO_2$, n-$In_2O_3$, n-ZnO);—photodiodes with a p-i-n structure, both homo-connection (e.g., p-Si:H/i-Si:H/n-Si:H) and hetero-connection (e.g., p-SiC:H/i-Si:H/n-Si:H) ;photosensitive elements with a multiple p-i-n structure, of the types p-i-n-p-i-n (e.g., p-SiC:H/i-SiC:H/n-Si:H/p-Si:H/i-Si:H/n-Si:H), p-i-n-i-p- (e.g. p-SiC:H/i-Si:Hin-Si:H/i-Si:?H/p-Si:H or p-i-n-i-n-i-p (e.g., p-SiC:H/i-SiC:H/n-Si:H/i-SiC:H/n-Si:H/i-Si:H/p-Si:H).

In this network of amorphous or polycrystalline material, the processing circuits are based on thin film field effect transistors. Such transistors use, generally but not solely, semiconductor layers of amorphous or polycrystalline silicon and dielectric layers of silicon-oxygen and silicon-nitrogen alloys and are produced in one or more of the following configurations:

staggered configuration;

inverted staggered configuration;

vertical configuration.

If the network has an optical output, the electrical output signals are converted into optical signals by photoemissive devices consisting of p-i-n diodes based on hydrogenated amorphous silicon-carbon, silicon-nitrogen and silicon-oxygen alloys or else by liquid crystal elements.

In the said network, the optical programming is realized by illuminating the photosensitive control elements by fixed masks or else by electrooptical transmission cells, such as liquid crystal cells or else electrochromic cells. As is known, the connection weights of neural networks can be obtained automatically by applying learning algorithms from examples, some of which can be realized in the form of electronic circuits thus making the network self-adaptive. If the CNN contains circuits of this type, a photosensitive area can be used to furnish the learning examples at the input.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
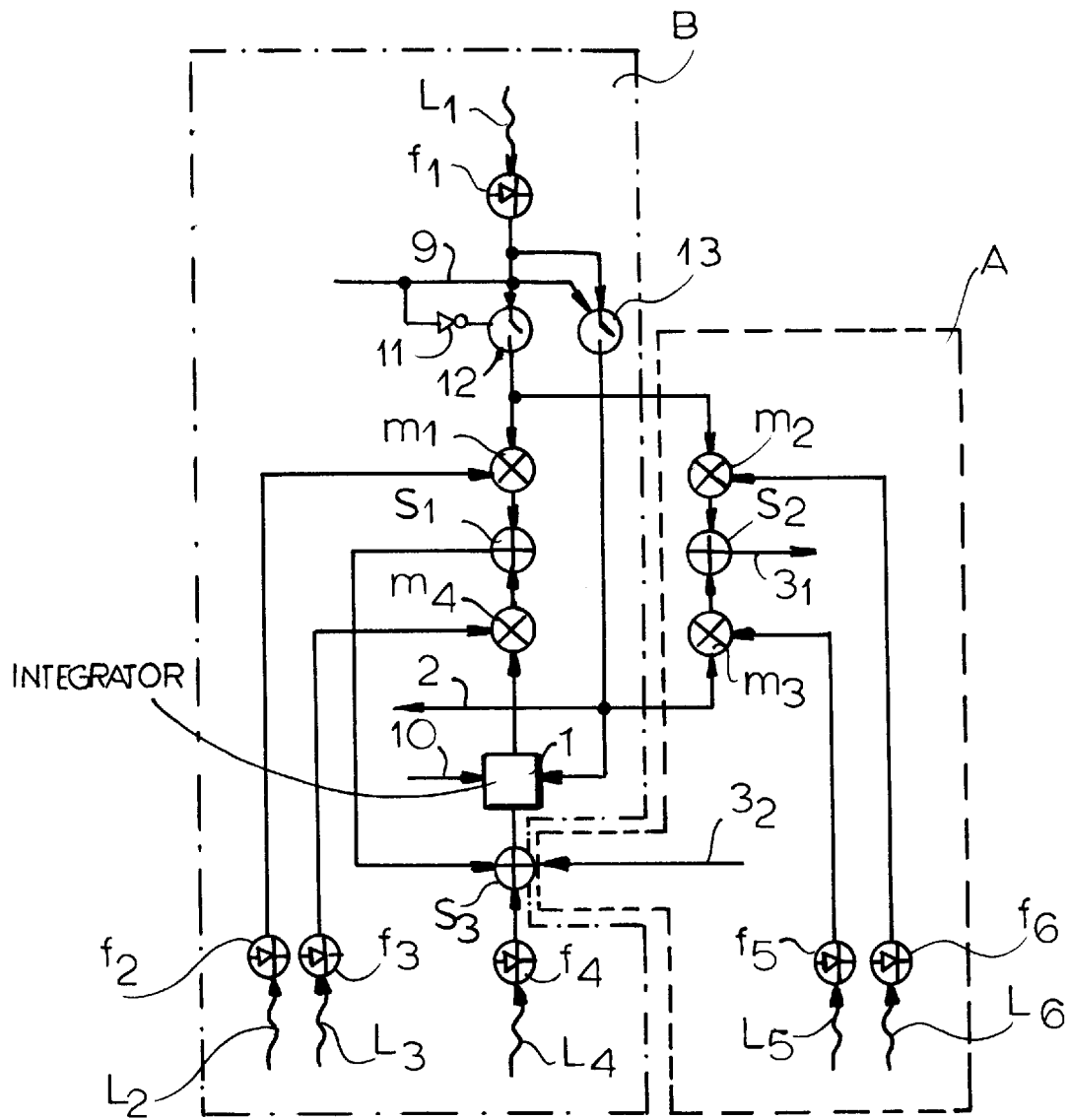
FIG. 1 is a diagram of a network cell, including the connections to a single neighboring cell.

FIG. 1 shows a network cell to which light signals L1 . . . L6 are applied and comprising photodiodes f1 . . . f6 an integrator 1 (see FIG. 3), and multipliers m1 . . . m4. The arrows indicate electrical signals. Output electrical signals 2 are generated and connections to an adjacent cell are illustrated at $3_1$, $3_2$. Electrical functioning control signals are supplied at 9, 10 in part to an inverter. The circuit also includes adders S1 . . . S3 and switches 12, 13.

FIG. 1 comprises two parts, A and B. A shows all the elements needed for connection to an adjacent cell, and should be considered repeated as many times as the number of cells connected. B shows all the elements which make up the basis core of the cell.

Again with regard to FIG. 1, the functioning of the cell is briefly described below:

The signal L1 is the input signal to be processed. All the other light signals L2 . . . L6 furnish the connection weights (control). Light signals L1 . . . L6 are converted into electrical signals (arrows) and these signals are processed by the electronic circuit which consists of the multipliers m1 . . . m4, the adders S1 . . . S3 and the integrator 1. The result of the processing is represented by the electrical output signal 2.

The input signal L1 may be used also to establish the initial conditions of the integrator, by connecting in the appropriate manner the photodiode f1 to the integrator 1 by means of the electronic switches 12, 13 of the inverter 11 and the control signal 9. This affords increased programmability.

Figure 2:
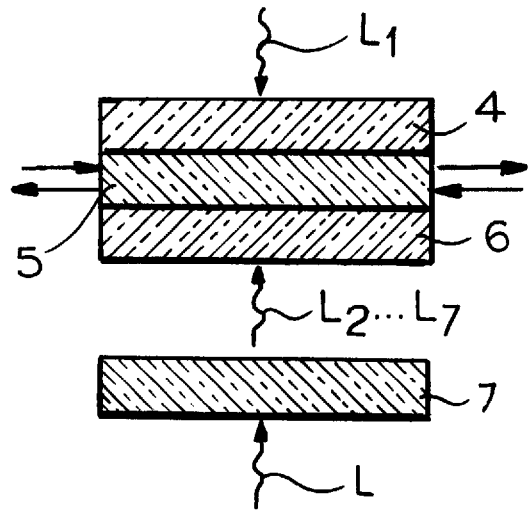
FIG. 2 is a cross sectional view of the layered structure of the cell.

FIG. 2 shows that the optical system can include a control layer 4, processing layer 5, an input layer 6 and a control mask 7. The arrows ← and → indicate electrical connections with the adjacent cells (L indicates light).

In FIG. 2 the light L traverses the control mask 7 and is here spatially modulated (e.g. attenuated point by point) to obtain the signals L2 . . . L6. The layer 4 contains the photodiodes f2 . . . f6. The layer 6 contains the photodiode f1, while layer 5 contains all electronic devices and connections. The processing layer 5 is connected to the similar layers of the adjacent cells. Normally, the network is formed by a single layered structure containing a matrix of cells without discontinuity between one another.

Figure 3:
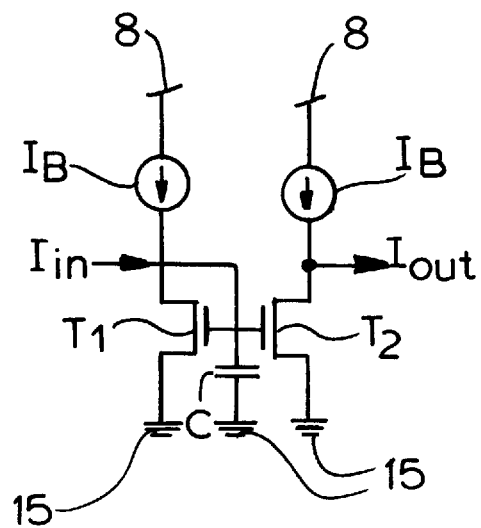
FIG. 3 is a circuit diagram of the integrator realized with a current mirror as has been shown in FIG. 1.

FIG. 3, as mentioned, shows the circuit diagram of the integrator 1, wherein T1 and T2 are thin film transistors or the like, $1_B$ are the appropriate current generating circuits, C is an integrated capacitor or else represents the equivalent capacity of the transistors' gates, 8 represents connections with power circuits, 15 shows the ground connections, the integrator input signal is represented by a current $I_{in}$; and the integrator output signal is represented by a current, $I_{out}$.

Figure 4:
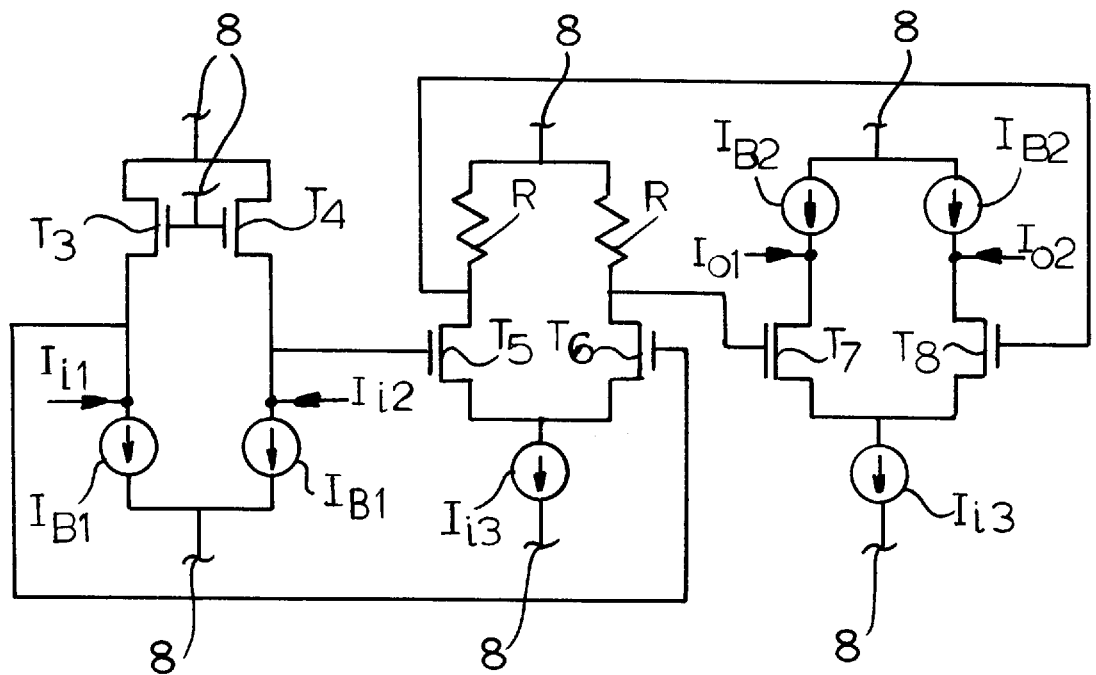
FIG. 4 is a diagram of the two-quadrant multiplier of FIG. 1.

FIG. 4 shows, in particular, one of the multipliers m visible in FIG. 1. The multiplier has connections 8 with power circuits, current generators $I_{B1}$, and $I_{B2}$, transistors T3 . . . T8 and resistors R.

$I_{11}$ and $I_{12}$ are currents obtained appropriately at the output of a photodiode, such that the quantity $I_{11}$ and $I_{12}$ represents one of the multiplication factors.

$I_{13}$ is the current obtained at the output of one of the integrators, or else is the current obtained at the output of one of the input photodiodes and represents the other multiplication factor.

$I_{o1}$ and $I_{o2}$ are the output currents which represent the result of the multiplication.

In order to obtain a programmable CNN, one can issue a cell matrix (network) with a layered structure (FIG. 2).

The photosensitive layer 6 of each cell (FIG. 2) contains a photodiode f1 which acts as an optical input device, and furnishes the electrical input signal to the underlying layer 5. The control layer 4 contains several photodiodes f2 . . . f6, one for each independent value of the connection priorities, which are the optical input devices for the light control signals L2 . . . L6.

It should be noted that the photodiodes f5 and f6 are in part A and hence they are repeated as many times as the number of cells connected.

The basic body of the cell (integrator) 1 and the interconnections between the cells and the connections with the inputs (multipliers, (m1 . . . m4)) are realized at the processing layer level by the circuits described above.

All the electrical signals, shows in FIG. 1, are represented by currents (arrows).

The integrator is formed by a current mirror (FIG. 3) in which the capacitor C can be omitted, when the input capacity of the transistor gates is sufficient.

The multiplication blocks m1 . . . m4, are realized by the use of the multiplier (FIG. 4).

The result is $I_{o1}$ and $I_{o2}=\alpha R(I_{11}-I_{12})I_{13}$, in which $\alpha$ depends on the geometry of the transistors and the polariation of the circuit.

$I_{13}$ represents the value of the state of the neighboring cell, or else the input, these signals are bound to be unipolar. $I_{11}-I_{12}$ represent the connection priority.

Figure 5:
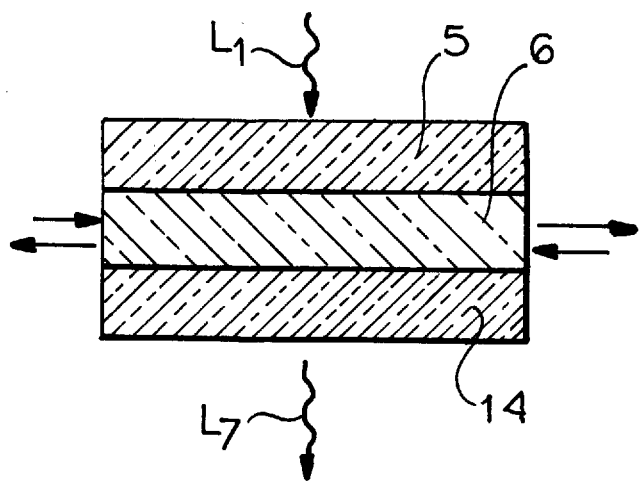
FIG. 5 is a diagram of a variant of the network including an optical output, the processing layer, the input layer and the output light signal.

As noted above, FIG. 5 represents a variant of the invention which has an optical output layer 14, a processing layer 5 and an input layer 6.

In this variant, the network has an optical input and an optical output. The output layer 14 consists of photoemissive diodes or of liquid crystal elements. In this latter acse, layer 14 itself is a stratified structure in which from the side of the processing layer there is a matrix of metallic contacts on which the output voltage signal is present. Adjacent to said layer is a layer of liquid crystals closed on the one side by a single transparent electrode connected to a fixed potential.

There being no control layer 4, control is carried out electronically. The advantage of this variant is that such a network is an image processing device with optical input and output.

Furthermore, to show that there are many possible variants, it should be mentioned that, if one wishes to retain optical programmability, it is possible, as an alternative, (FIGS. 1 and 5) to form the photoemissive diodes in input layer 4 together with the photosensitive devices while layer 6 is used for optical programming. In this case, one uses photosensitive devices which are selective with respect to the light wavelength (devices with a multiple p-i-n structure described above) so as to distinguish the input image from the output image on the base of the wavelength (color) of the light.

We claim:

1. An optoelectronic cellular neural network of mutually interconnected optically programmable cells, each of said cells having a photosensitive input layer receiving a light signal forming an input, a processing layer adjacent said photosensitive input layer and including electronic circuitry for processing said light signal forming said input and producing output signals connected to processing layers of other cells connected in said network, and a photosensitive control layer adjacent said processing layer for receiving control light signals and delivering programming signals to said processing layer whereby said output signals are determined by programming resulting from the control light signals applied to said photosensitive control layer, said photosensitive layers being on opposite sides of said processing layer.

2. The optoelectronic cellular neural network defined in claim 1 wherein said photosensitive input layer comprises photoresistors; Schottky junction photodiodes between amorphous semiconductors and semitransparent metals; photodiodes with junctions between amorphous semiconductors and transparent nonmetallic materials and conductors including doped oxides selected from the group which consists of n-$SnO_2$, n-$In_2O_3$ and n-ZnO; heterojunction and homojunction p-i-n photodiodes including p-SIH:H/I-SI:/n-SI:H and p-SIC:/I-SI:H/n-SI:H; or multiple p-i-n structure photosensitive elements including the p-i-n-p-i-n p-SIC:H/I-SIC:H/n-SI:H/p-SI:H/I-SI:n-SI:H, the p-i-n-i-p p-SIC:H/I-SI:H/n-SI:H/I-SI:H/p-SI:H, and the p-i-n-i-n-i-p p-SIC:H/I-SIC:H/n-SI:H/I-SIC:H/n-SI:H/p-SI:H.

3. The optoelectronic cellular neural network defined in claim 2 wherein said processing layer concludes an integrator, a plurality of multipliers and control circuits composed at least in part of thin-film field-effect transistors.

4. The optoelectronic cellular neural network defined in claim 3 wherein said photosensitive control layer comprises photoresistors; Schottky junction photodiodes between amorphous semiconductors and semitransparent metals; photodiodes with junctions between amorphous semiconductors and transparent nonmetallic materials and conductors including doped oxides selected from the group which consists of n-$SnO_2$, n-$In_2O_3$ and n-ZnO; heterojunction and homojunction p-i-n photodiodes including p-SIH:H/I-SI:/n-SI:H and p-SIC:/I-SI:H/n-SI:H; or multiple p-i-n structure photosensitive elements including the p-i-n-p-i-n p-SIC:H/I-SIC:H/n-SI:H/p-SI:H/I-SI:n-SI:H, the p-i-n-i-p p-SIC:H/I-SI:H/n-SI:H/I-SI:H/p-SI:H, and the p-i-n-i-n-i-p p-SIC:H/I-SIC:H/n-SI:H/I-SIC:H/n-SI:H/p-SI:H.

5. The optoelectronic cellular neural network defined in claim 1, further comprising a control mask ahead of said photosensitive control layer for resolving an input control signal into a plurality of control light signals delivered to said photosensitive control layer.

6. The optoelectronic cellular neural network defined in claim 1 wherein said processing layer of each cell includes self-adaptation learning circuits.

7. The optoelectronic cellular neural network defined in claim 1 wherein said at least one of said photosensitive layers is constructed and arranged to supply input images representing learning examples to said network.

8. The optoelectronic cellular neural network defined in claim 1 wherein the photosensitive layers and processing circuits are integrated in a single layered structure.

9. The optoelectronic cellular neural network defined in claim 1 wherein said network comprises optical output devices connected to said processing layers and comprised of hydrogenated amorphous silicon-carbon, silicon-nitrogen or silicon-oxygen p-i-n diodes or liquid crystal elements.

10. The optoelectronic cellular neural network defined in claim 9 wherein said optical output devices are provided in at least one layer.

11. An optoelectronic cellular neural network of mutually interconnected optically programmable cells, each of said cells having a photosensitive input layer receiving a light signal forming an input, a processing layer adjacent said photosensitive input layer and including electronic circuitry for processing said light signal forming said input and producing output signals connected to processing layers of other cells connected in said network, and a photosensitive output layer adjacent said processing layer and provided with photoemissive devices generating a light output from output signals produced by said processing layer, said cells each being provided with means for receiving control light signals and delivering programming signals to said processing layer whereby said output signals are determined by programming resulting from the control light signals, said photosensitive layers being on opposite sides of said processing layer.

12. The optoelectronic cellular neural network defined in claim 11 wherein said photoemissive devices are hydrogenated amorphous silicon-carbon, silicon-nitrogen or silicon-oxygen p-i-n diodes or liquid crystal elements.

13. An optoelectronic cellular neural network of mutually interconnected optically programmable cells, each of said cells having a photosensitive input layer receiving a light signal forming an input, a processing layer adjacent said photosensitive input layer and including electronic circuitry for processing said light signal forming said input and producing output signals connected to processing layers of other cells connected in said network, and a photosensitive control layer adjacent said processing layer for receiving control light signals and delivering programming signals to said processing layer whereby said output signals are determined by programming resulting from the control light signals applied to said photosensitive control layer, said photosensitive layers being on opposite sides of said processing layer, one of said photosensitive layers being formed with photoemissive devices connected to said processing layer for generating a light output from said output signals said light output differing by frequency from said light signal forming said input.

* * * * *